United States Patent [19]
Lakshman et al.

[11] Patent Number: 5,537,446
[45] Date of Patent: Jul. 16, 1996

[54] SMOOTHING DELAY-SENSITIVE TRAFFIC OFFERED TO ASYNCHRONOUS TRANSFER MODE NETWORKS

[75] Inventors: Tirunell V. Lakshman, Eatontown; Teunis J. Ott, Chester; Mohammed A. J. Tabatabai-Yazdi, Ocean, all of N.J.

[73] Assignee: Bell Communications Research, Inc., Morristown, N.J.

[21] Appl. No.: 153,538

[22] Filed: Nov. 15, 1993

Related U.S. Application Data

[63] Continuation of Ser. No. 827,329, Jan. 29, 1992.

[51] Int. Cl.$^6$ .................................................. H04L 7/00
[52] U.S. Cl. ........................... 375/371; 375/377; 370/84; 370/94.2
[58] Field of Search ............................ 375/34, 118, 377; 370/84, 102, 108, 60, 61, 94.1, 17, 94.2, 60.1; 358/133, 137; 341/61

[56] References Cited

U.S. PATENT DOCUMENTS

| | | | |
|---|---|---|---|
| 5,115,429 | 5/1992 | Hluchyj et al. | 370/84 |
| 5,159,447 | 10/1992 | Haskell et al. | 358/135 |

OTHER PUBLICATIONS

"Statistical Multiplexing For Variable Bit Rate Video Codecs in ATM Networks," Helmut Heeke, International Journal of Digital and Analog Communication Systems, vol. 4, pp. 261–268, 1991.

"Modeling and Analysis of a Variable Bit Rate Video Multiplexer," G. Ramamurthy et al, Proceedings of Seventh Specialist Seminar, International Teletraffic Conference, pp. 1–8, Oct. 1990.

"Definition of a Universal ATM Video Coding Architecture," W. Verbiest et al, Proceedings of Third International Workshop on Packet Video, Morristown, N.J., pp. 1–6, Mar. 1990.

"A Variable Bit Rate Video Codec for Asynchronous Transfer Mode Networks," W. Verbiest et al, IEEE Journal on Selected Areas in Communications, vol. 7, No. 5, pp. 761–770, Jun. 1989.

*Primary Examiner*—Stephen Chin
*Assistant Examiner*—T. Ghebretinsae
*Attorney, Agent, or Firm*—Leonard Charles Suchyta; Joseph Giordano

[57] ABSTRACT

A methodology and concomitant circuitry for smoothing delay sensitive traffic utilizes short term traffic forecasts and guarantees meeting a prespecified delay constraint. The pattern of incoming traffic is used to forecast estimates of future incoming data from the present and past incoming data. Corresponding to the estimate is a data rate for propagating stored data to produce a smoothed outgoing data rate, and the interval of time over which such a rate is used so as to satisfy the delay constraint. The estimation procedure is then re-invoked at the end to the time interval, which takes into account data arriving during the time interval, so as to determine the next succeeding data rate and a new time interval for propagating stored data.

16 Claims, 10 Drawing Sheets

SMOOTHING DELAY-SENSITIVE TRAFFIC OFFERED TO ASYNCHRONOUS TRANSFER MODE NETWORKS

This application is a continuation of application Ser. No. 07/827,329 filed Jan. 29, 1992.

FIELD OF THE INVENTION

This invention relates generally to high-speed digital communication networks and, more specifically, to smoothing variable rate data in asynchronous transfer mode networks to increase network performance such as carrying more traffic for a given loss rate.

BACKGROUND OF THE INVENTION

Recently telecommunication networks have been implemented using packet switched connections, in contrast to circuit switched connections, in order to more effectively utilize communication links and to improve throughput efficiency. One type of packet switched connection utilizes the so-called asynchronous transfer mode (ATM). This mode involves asynchronous time division multiplexing and high-speed packet switching. In essence, ATM transports information in the form of specialized packets referred to as "cells". Each ATM cell includes a header followed by accompanying data. The header contains a label which is used for multiplexing and routing.

As an example of a communication service utilizing an ATM network, a video channel is considered. Broadly, such a channel essentially includes: a transmitter; a receiver; and an ATM network link. The ATM network link is provided by the ATM network which is composed of switching elements, resource managers, and physical signal propagation media such as fiber optic cables, interconnecting the transmitter with the receiver. The transmitter is composed of a video camera which is connected to a coder that encodes and generates bits for each video frame passed to it by the camera. The frame generation rate is, for example, 25 Hz or the U.S. standard of 30 Hz. The coder generates a variable number of bits for each frame. These generated bits are buffered with a buffer device in the transmitter. The buffer converts the bit stream to ATM cells and then the cells propagate onto the medium through an ATM packet switched network coupling the buffer to the medium. The propagation medium transports the cells to the receiver where the original information bits are detected via a receiver including a decoder and a display monitor.

Much research attention has been focussed on methods for providing such video transmission using ATM networks, such as described by numerous articles in the: *Proceedings of the Seventh Specialist Seminar*, International Teletraffic Conference, October 1990; *Proceedings of the Third International Workshop on Packet Video*, Morristown, N.J., March 1990; and *IEEE Journal on Selected Areas of Communication*, June 1989. A central issue which has been the focus of numerous investigations is whether variable bit rate (VBR) schemes are better than constant bit rate schemes (CBR). In both CBR and VBR the number of bits varies from frame to frame. In CBR, bits are transmitted at a constant rate per frame, so that different frames take different amounts of time to be transmitted. In VBR, the approach is to transmit as many bits as possible in each frame interval, so that a highly variable rate results. Occasionally, the constant bit rate forces a decrease in picture quality because the bandwidth is too low to handle quickly changing scenes, and fairly often the constant bit rate forces the sending of superfluous bits because slowly changing pictures can be represented with much fewer bits. In VBR, the approach is to transmit only the bits really needed, and (in principle) to transmit all bits from a frame within that frame interval, or very soon afterwards. As a result, VBR has lower average need for bandwidth, but a much higher variability in the traffic.

For efficient use of network resources it may be necessary to multiplex several video sources onto the same transmission link. Then, an important parameter determining the usefulness of VBR schemes is the statistical multiplexing gain defined as the ratio of the number of multiplexed VBR sources to the number of multiplexed CBR sources while maintaining the same subjective picture quality (a definition proposed by H. Heeke in the paper "Statistical Multiplexing Gain for Variable Bit Rate Video Codecs in ATM networks," *Proc. 4th International Packet Video Workshop*, Tokyo, Japan, March 1991). The picture quality degrades with increases in cell losses. Hence, if the number of multiplexed sources can be increased without increasing cell losses (or cell losses reduced for a given number of sources) the statistical multiplexing gain should increase.

The traffic offered to the network can be made more regular by smoothing. Essentially, in smoothing such traffic, frames consisting of more bits (or cells) take longer to be transmitted than frames consisting of fewer bits (or cells). A main disadvantage of such a smoothing scheme is added delay of the information at the smoothing point. For interactive video such as video conferencing this may be a serious drawback.

The prior art has not disclosed or suggested what could be considered a compromise in traffic smoothing situations, namely, an approach to smoothing whereby, for delay sensitive traffic, an upper bound is imposed on the added delay, and the traffic is smoothed as much as possible subject to that constraint. This approach demands (at least partial) fore-knowledge of traffic arriving at the smoothing point: if a lull in the traffic is imminent then traffic already waiting at the smoothing point must be spread out until the largest allowed delay, while if a peak is imminent then traffic already available must be sent at a higher rate to prevent the need for an even higher rate later.

SUMMARY OF THE INVENTION

These shortcomings and other limitations and deficiencies in the prior art are alleviated, in accordance with the present invention, by reducing cell losses (thereby increasing the statistical multiplexing gain and effectiveness of VBR video) by smoothing traffic at the video sources. The present invention relates to a technique for smoothing delay sensitive traffic that utilizes imperfect short term traffic forecasts and guarantees meeting prespecified delay constraints. If the forecasts become perfect then the smoothing becomes optimal (subject to the prespecified delay constraints.) The form of the delay constraints used in this invention makes the technique particular useful for video.

Broadly, the method for processing incoming traffic data to produce a smoothed outgoing traffic stream first stores the incoming data to produce stored data. The stored data is used to iteratively forecast estimates of future incoming traffic from the pattern of past history of the traffic flow. Corresponding to each forecast is a data rate for propagating the stored data to produce the smoothed outgoing stream, and the interval of time over which such a rate is utilized. An appropriate smoothing algorithm is invoked to compute each data rate and associated time interval. Finally, the actual outgoing stream is produced by propagating the stored data on a first-in, first-out basis at the given rate for the given interval. The estimation procedure is then iteratively re-invoked to determine the succeeding data rate and time interval.

Even though the illustrative embodiment of the present inventing is presented in terms of a method for smoothing variable bit-rate delay-sensitive traffic offered to an ATM network, for example, the method is described in the context of smoothing variable bit rate video traffic, the methodology can be used in other applications such as for smoothing delay-sensitive traffic at a LAN—ATM interface, that is, smoothing in a transition for large packets to small cells.

DETAILED DESCRIPTION

In this description, so as to gain insight into the underlying principles in accordance with the present invention, a motivating example of a simplified aspect of the present invention is initially presented. This approach has the added advantage of introducing notation which will further aid in understanding the broad aspects of the present invention. After this introduction, a theoretical basis is then presented to provide additional insight into the circuitry and concomitant methodology which are presented after the elucidation of the theoretic basis.

ILLUSTRATIVE EXAMPLE

Figure 1:
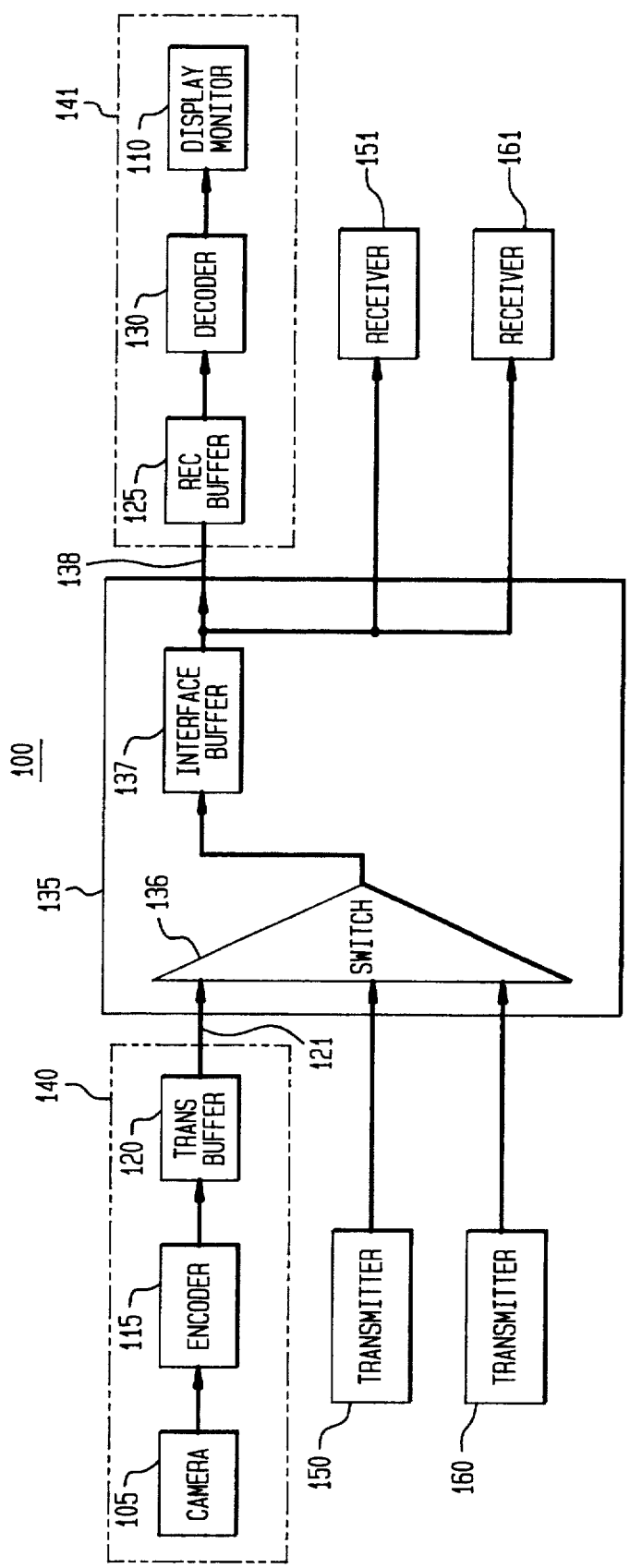
FIG. 1 is a block diagram of an illustrative video communication network utilizing an ATM network.

With reference to FIG. 1, there is shown circuitry 100 for transmitting information from video camera 105 to display monitor 110. Illustratively, camera 105 is a conventional TV camera which generates a series of video frames at a standard rate of 25 Hz. The output of camera 105 serves as an input to encoder 115, which encodes and generates a bit stream for each video frame or subframe passed to it by camera 105. Encoder 115 generates a variable number of bits per frame depending upon the complexity of the difference between a frame and the previous frame. The bits produced by encoder 115 are stored in transmit buffer 120. The combination of camera 105, encoder 115 and buffer 120 is referred to as transmitter 140. Buffer 120 emits an output bit stream which is partitioned into "cells". Each cell is a subset of the original information bits from a given frame plus additional bits such as header and trailer bits used to route each cell. These cells are delivered to ATM network 135, which transports each of the cells over channel 138 to the destination receiver 141. Receiver 141 includes a conventional cascade combination of receive buffer 125, decoder 130, and display monitor 110. ATM network 135, for example, may also transport streams of cells generated by other transmitters 150, . . . ,160 to corresponding receivers 151, . . . ,161. If it is presumed that ATM network 135 has a capacity of 40M bits/sec., and each transmitter is capable of delivering 8M bits/sec., then about five such transmitter-receiver pairs can be handled by one ATM network.

ATM 135 is shown as being composed of cell switch 136 and interface buffer 137. Switch 136 performs a multiplexing operation whereby the cells from the plurality of transmitters are interleaved to generate a stream of cells that are delivered to buffer 137. Buffer 137 is, illustratively, a First-In, First-Out (FIFO) buffer which stores cells for delivery as a high-rate bit stream propagating over channel 138.

Figure 2:
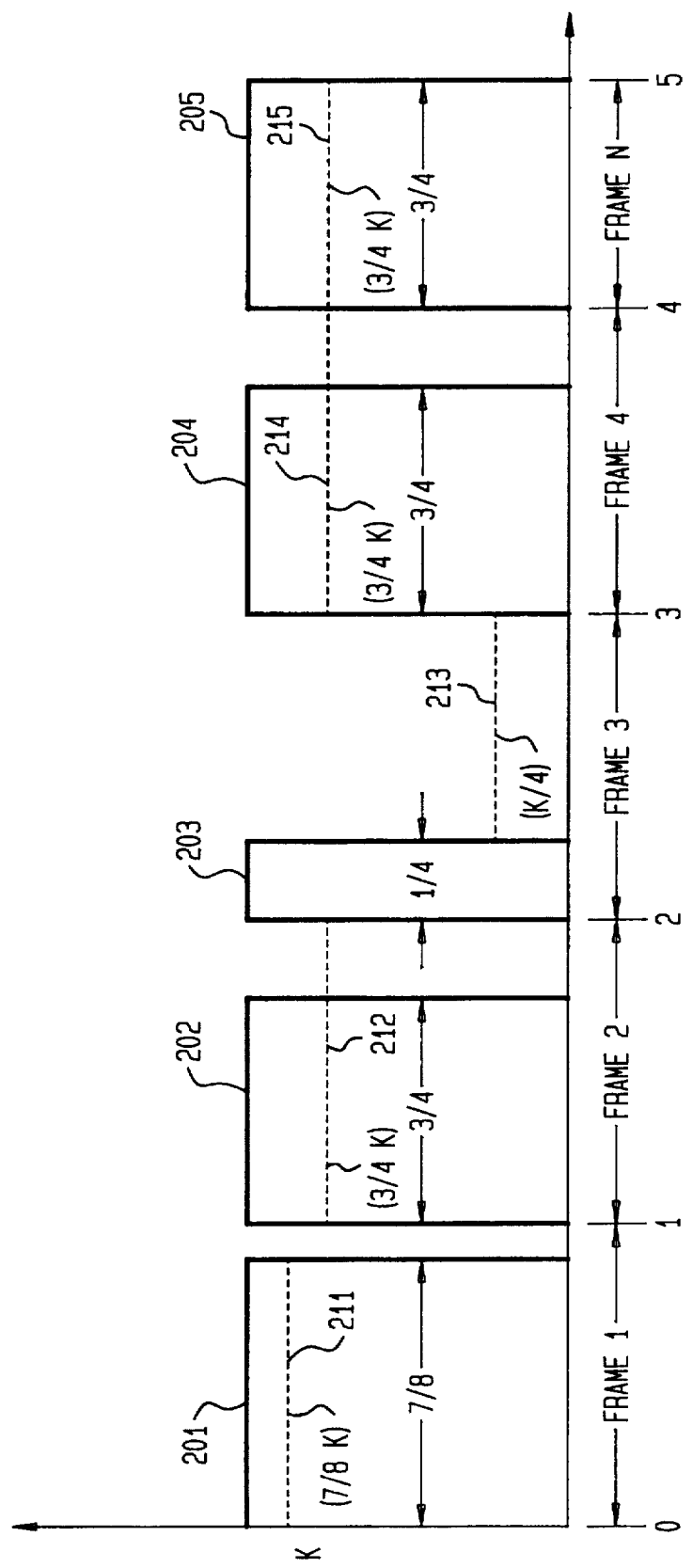
FIG. 2 is a time-line diagram for an illustrative example depicting a plurality of video frames showing a distribution of the number of bits necessary to represent information in each frame.

The variable nature of the number of bits generated per frame by encoder 115 is depicted by an exemplary time diagram of FIG. 2. In Frame 1, solid line 201 indicates that a fixed number of cells/sec., designated K, is propagated by buffer 120 for ⅞ of the frame interval (which, for example, is 40 msec. for a 25 frame/sec. video camera), whereas: line 202 of Frame 2 indicates that buffer 120 propagates K cells/sec. for ¾ of its allocated frame interval; line 203 of Frame 3 corresponds to K cells/sec. for ¼ of its frame interval; line 204 of Frame 4 corresponds to K cells/see. for ¾ of its frame interval; and line 205 of Frame N corresponds to K cells/see for ¾ of its frame interval. For the sake of ease of presentation, each frame interval is normalized to one unit of time.

The area under each line 201–205 represents, in effect, the total number of cells required to represent information conveyed by a given frame. As is apparent from FIG. 2, each frame interval has an idle period during which no cells are being propagated from buffer 120 to ATM 135. For example, ¾ of Frame 3 is idle. Thus, even though each frame *may* produce K cells/sec. for the full frame, quite often only part of a given frame is active, that is, less than K cells/sec. are needed to convey information about a given frame. Conventionally, in allocating the number of transmitters which are connected to each ATM network, the maximum number of cells/sec. for each transmitter is used for computing the allocation. For instance, as above, the maximum number of transmitters allowed was five based on the 40M bits/sec. capacity of ATM 135 and the 8M bits/sec. (equivalent to about 22,700 cells/sec.) maximum rate for each transmitter.

Also shown in FIG. 2 are dotted lines 211–215, which represent, respectively, the average number of cells/sec. transmitted per frame which would fully utilize each frame. For example, if 7K/8 cells/sec. were transmitted during the full interval of Frame 1 (rather than K cells/sec. for ⅞ the interval), then the same number of cells would still be received by the corresponding receiver in the given frame. The technique of selecting a cell rate µK, (0≤µ≤1) which spreads the total number of cells to be transmitted per frame over the complete frame is called "smoothing". In general, the cell rate µK for each "smoothed" frame is less than the maximum cell rate K. On average, the "smoothed" frame has a cell rate µK which is less than K; only a "full" frame causes µK to equal K. While the likelihood of a full frame may not be probabilistically small, the likelihood of all transmitters 140,150, . . . 160 presenting a full frame to ATM 135 during essentially the same frame interval is extremely small. Accordingly, the number of transmitters allocated to an ATM may be increased if "smoothed" frames can be delivered to the ATM.

By way of devising a procedure to smooth traffic which utilizes *forecast* information about the expected future traffic flow, the following constraint is imposed: for each frame boundary (t=1,2,3, . . . in FIG. 2), generally designated $T_{fb}$, an increment of time is selected, designated Δ, and it is required that all information arriving in the frame ending at $T_{fb}$ must be propagated from buffer 120 to ATM 135 by the time point $T_{fb}$+Δ. With this constraint, it is possible to recast FIG. 2 to generate a rate diagram based on impending traffic flow.

Figure 3:
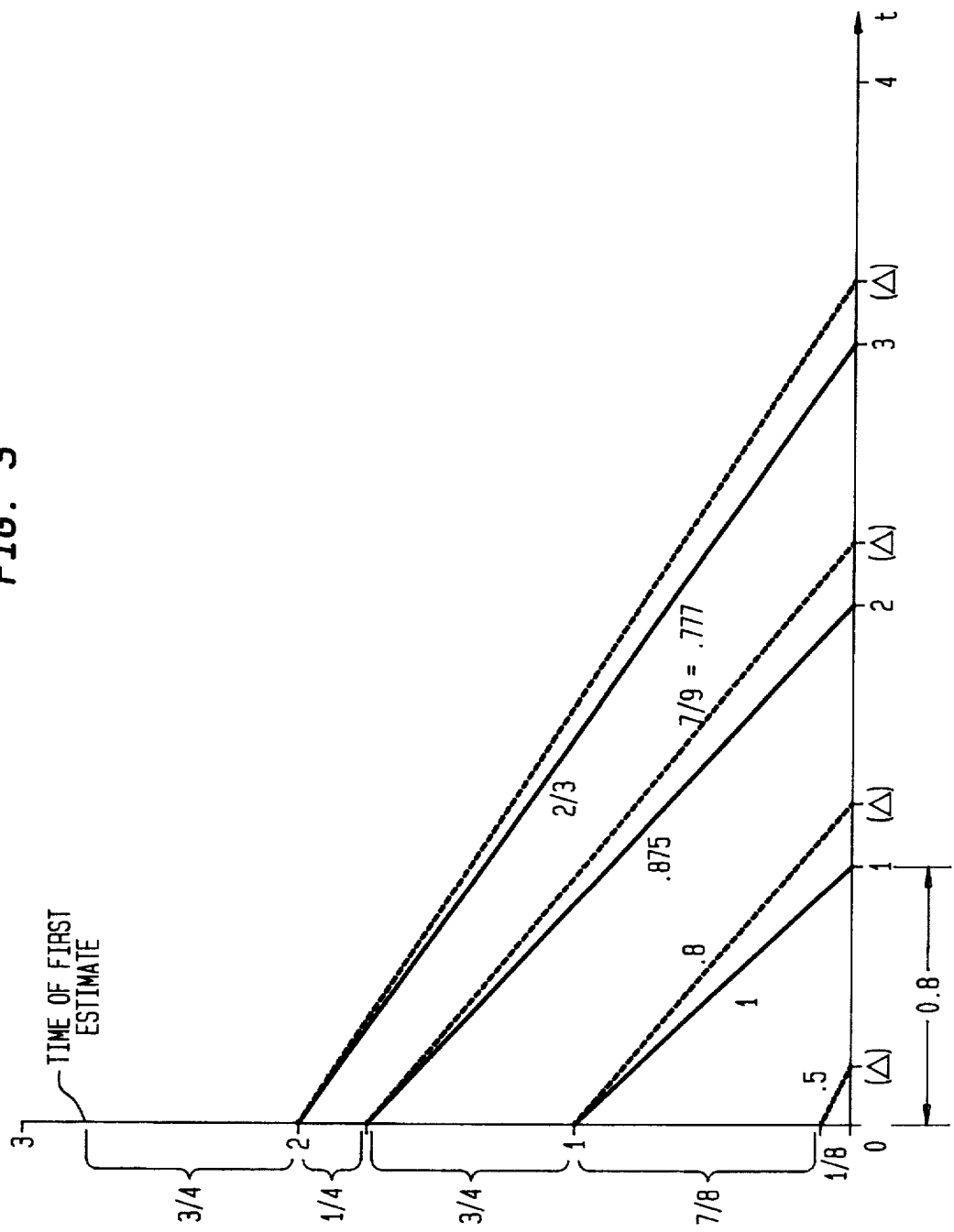
FIG. 3 is a rate diagram for a first estimation time depicting a graph of cells versus time, wherein the cells are from frames accumulated as a result of estimating future frame size based on past and present frame content.

In order to generate this rate diagram, the conceptual model depicted in FIG. 3 is constructed; FIG. 3 is a visualization of FIG. 2 from another viewpoint, namely, the abscissa/horizontal still represents time and, in particular, Frame 1 through Frame 4, but the ordinate/vertical is the accumulation of the time durations in each Frames 1 through 4 for which the given frame is actively propagating cells. In addition, it is presumed that there is a residual number of cells, shown on a normalized basis as ⅛ in the ordinate direction from 0. to ⅛, which must be accounted for at the time of the visualization, which is initially chosen to be t=0. Thus, in the ordinate direction, on a normalized basis, 0 to ⅛ corresponds to this residual number of cells, whereas: ⅛ to 1.0 corresponds to the ⅞ duration of Frame 1; 1.0 to 1.75 corresponds to Frame 2; 1.75 to 2.0 corresponds to Frame 3; and 2.0 to 2.75 corresponds to Frame 4. Also shown on the abscissa are tick marks at 0.25, 1.25, 2.25, and 3.25, which correspond to Δ, 1+Δ, 2+Δ, and 3+Δ, that is, Δ=0.25. If it is presumed that the layout of FIG. 2 is a snapshot occurring at time t=0, then the propagation of cells portrayed as occurring in Frames 1–4 is actually transport activity which will occur in the future relative to t=0. Accordingly, the active propagation durations shown in Frames 1–4 should be interpreted as estimates of future frame activity at time t=0, rather than known quantities. The consideration now becomes one of determining what propagation rate to select in order to ensure that, based on the estimates of future frame size, cell information stored in buffer 120 is properly transported, that is, no cell information is lost, until another estimation of cell activity is effected at a future time point; such a procedure is outlined below for the illustrative example.

In order to finish transporting all residual cells by time t=0.25, then, using a mathematical rate-time algorithm as identified below, a normalized rate (magnitude of the slope) of 0.5 bits/see. (⅛ divided by ¼) is determined. This rate of 0.5 may be considered as one lower bound on the rate of propagation, since the rate must be at least this rate in order to effect the transport of the residual bits by time Δ. On the other hand, a normalized rate of 1.00 (1 divided by 1) is needed to clear from interface buffer 137 the total number of cells that are in the combination of the residual plus Frame 1 (⅛+⅞) by 1.0 secs. This rate of 1.00 may be considered as one upper bound on the rate of propagation since there is no need to propagate at a faster rate, that is, there would be some idle time during Frame 1 which would result in less than ideal smoothing.

Another lower bound on the rate is computed by requiring all residual cells plus the cells of Frame 1 to be completely propagated by 1+Δ seconds; this next rate is 0.8 (1 divided by 1.25). Continuing in this manner, an alternating sequence of upper bound rates is computed for each frame boundary (t=1,2,3,4, . . . ), and a sequence of lower bound rates is computed for each frame boundary +Δ (t=0.25,1.25,2.25, 3.25, . . . ) as outlined above. The following so-called "bound sequence" of alternating lower bound and upper bound rates obtains for the rate diagram of FIG. 3: {0.5, 1.00, 0.8, 0.875, 0.777, 0.667, . . . }. A graph of these bounds is summarized by the column labeled "Bound Sequence 1" in the depiction of FIG. 4. The dashed lines are lower bounds and the solid lines are upper bounds. Each line has associated with it a sequence number in parenthesis, which indicates the order in which the bound appears in the sequence; for example, the dashed line at 0.5 has the sequence number (1), whereas the solid line at 0.667 has the sequence number (6).

It is noted that through the fifth sequence number, all lower bounds were less than all upper bounds. However, the upper bound represented by the sequence number (6) falls below at least one lower bound (namely, lower bounds associated with sequence numbers (3) and (5)). This event triggers the following actions. First, there is no need to further compute members of the bound sequence. Second, both the rate required to transport cells and the duration over which this rate exists is determined. In this case, when an upper bound falls below a lower bound, the greatest lower bound rate is selected as the transport rate, along with the duration associated with this rate. In this example, the greatest lower bound is 0.8, and this is associated with the duration from 0.≤t≤1.25. Accordingly, the cells in buffer 120 are propagated at the normalized rate of 0.8 from t=0.0 to t=1.25. Third, a time to compute a new estimate of transport rate has been established, namely, t=1.25.

The event of an upper bound falling below a lower bound and the resultant actions can be interpreted as follows. Until the violation of the "upper>lower" constraint, there is a rate that satisfies all bound conditions. For example, with reference to FIG. 4, for the sequence numbers (1)–(5) (before bound (6) is added to the graph), any rate between 0.8 and 0.875 would satisfy both upper bound and lower bound requirements. With the introduction of upper bound (6), it is no longer possible to satisfy all of bound (1)–(6) requirements by a single rate. To further make this point, a rate value of, say, 0.65 would satisfy all upper bound requirements, but could not satisfy the lower bound requirements of bounds (3) and (5). On the other hand a rate of, say, 0.85 could satisfy all lower bound requirements, but could not satisfy upper bound (6). Thus, a violation of the "upper>lower" constraint establishes a decision point. In such a case, one possible solution is to select the "greatest lower bound" as the rate of propagation over the time duration giving rise to the "greatest lower bound". This solution maximizes smoothing. To reiterate then, the greatest lower bound in this example is 0.8 over the duration 0.≤t≤1.25; this duration is illustrate in FIG. 3 on the abscissa.

Figure 4:
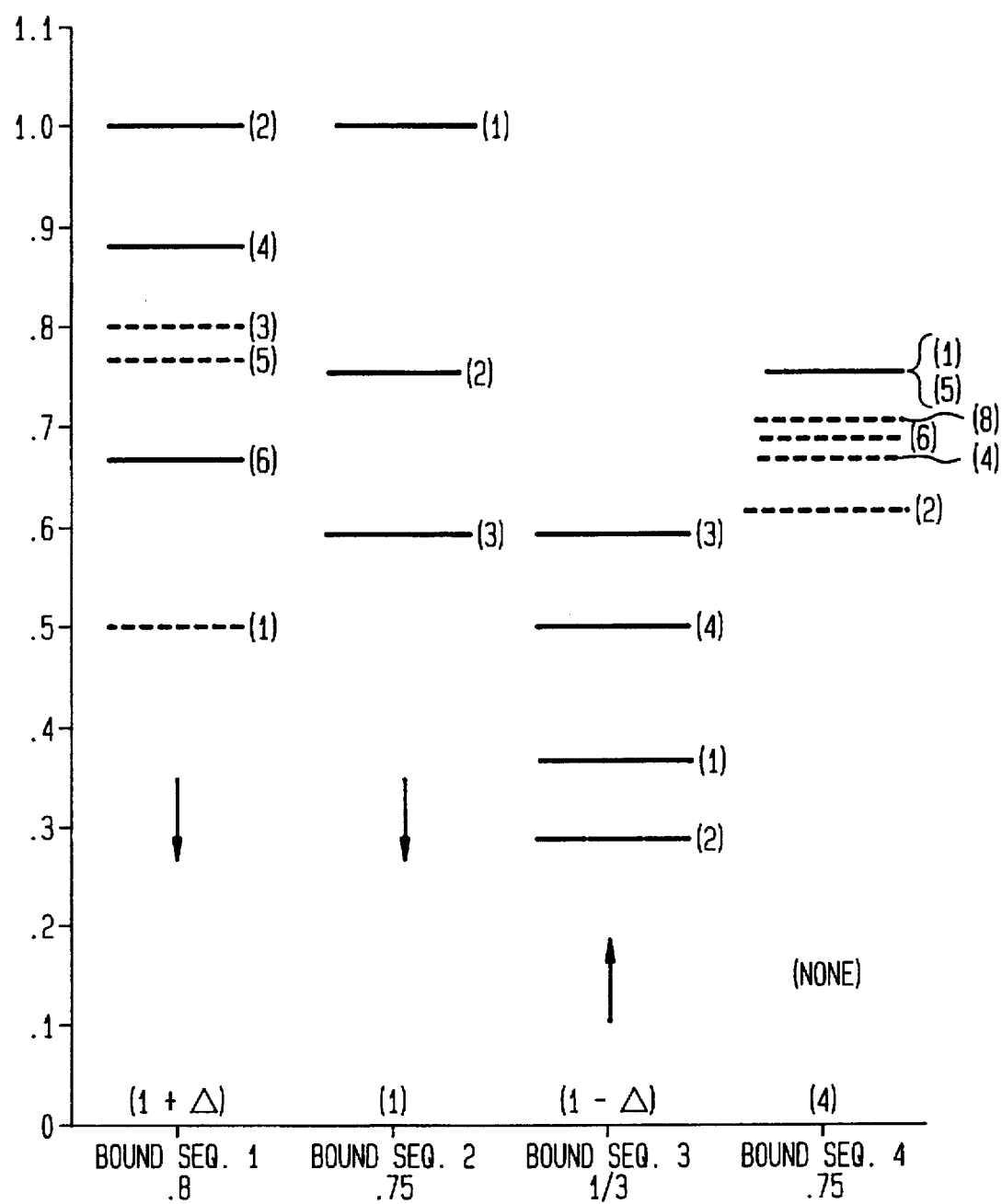
FIG. 4 is a plot of upper and lower rate bounds for a series of estimation times.
Figure 5:
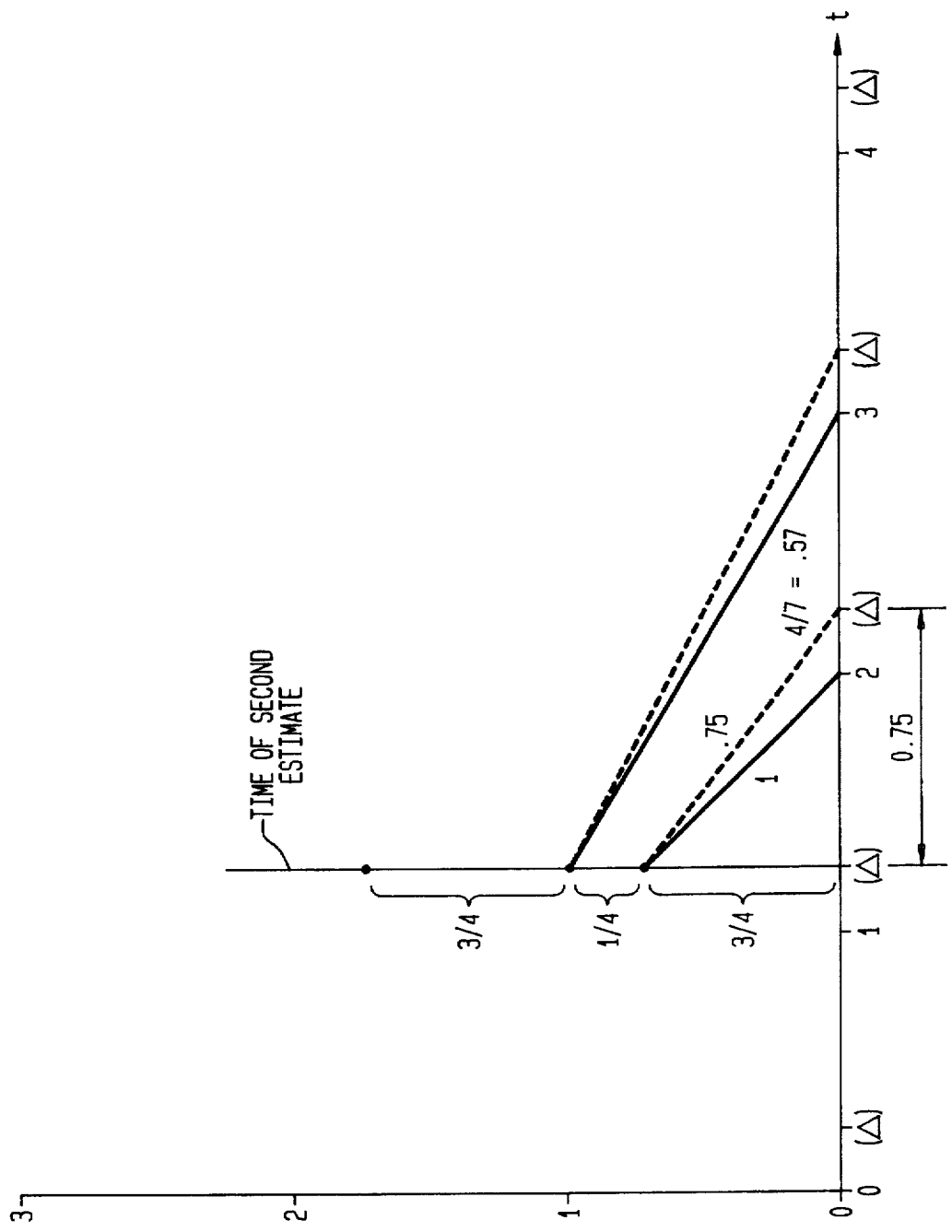
FIG. 5 is another rate diagram for a second estimation time depicting a graph of cells versus time, wherein the cells are from frames accumulated as a result of estimating future frame size based on past and present frame content.

As now depicted in FIG. 5, another rate diagram is constructed at time t=1.25 in order to determine a new rate and the time over which such a rate is valid. Again, traffic estimates are used to obtain information about the number of cells to be propagated in future frame intervals; at the time instant of t=1.25, Frames 2,3, . . . are future frames. If it is assumed, for sake of simplicity, that the new traffic estimates are still the same predicted values as plotted in FIG. 2, then FIG. 5 obtains. The ordinate value from 0. to 0.75 is the contribution due to Frame 2, whereas the ordinate value from 0.75 to 1.0 is due to Frame 3, and the ordinate value from 1.0 to 1.75 is due to Frame 4. An alternating sequence of upper and lower rate bounds is computed as follows: {1.0, 0.75, 0.57}. A graph of these bounds is also depicted in FIG. 4, in the column labeled "Bound Sequence 2." Again there is a violation of the "upper > lower" constraint by the introduction of the third sequence number, that is, upper bound 0.57 associated with the third sequence number is less than lower bound 0.75 associated with the second sequence number. The same series of events as occurred for the computation made at t=0 is now triggered upon locating this constraint violation, namely: bound computations for this sequence are terminated; the greatest lower bound of 0.75 is selected; and a time to make a new estimate, t=2.25, is determined. The new rate of 0.75 lasts from 1.25 to 2.25 secs., as shown on the abscissa of FIG. 5.

Figure 6:
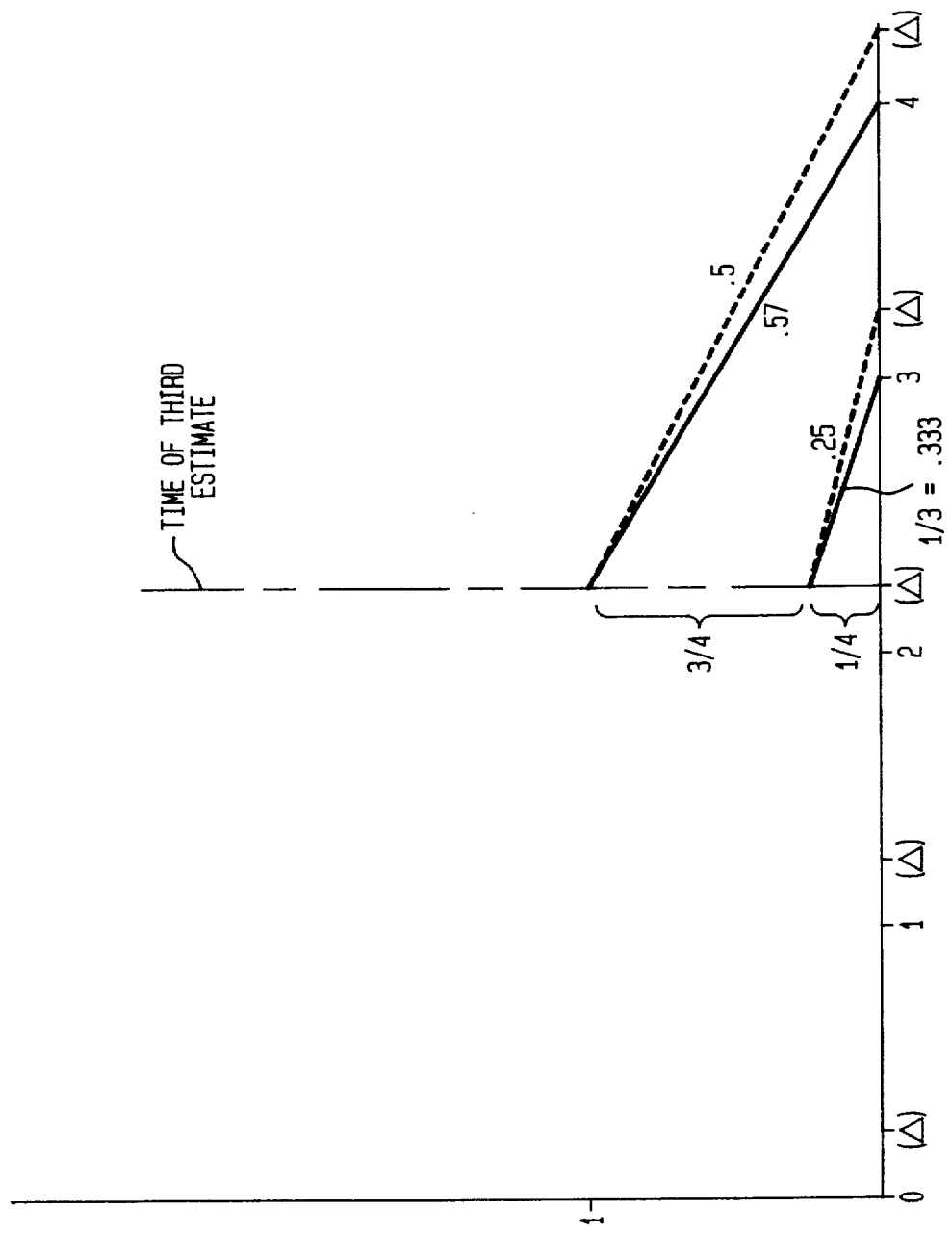
FIG. 6 is still another rate diagram for a third estimation time depicting a graph of cells versus time, wherein the cells are from frames accumulated as a result of estimating future frame size based on past and present frame content.

As now depicted in FIG. 6, a new rate diagram is constructed at time t=2.25 in order to determine a new rate and the time over which such a rate is valid. Again, traffic estimation formulas used to obtain information about the number of cells to be propagated in future frame intervals; at the instant t=2.25, Frames 3,4, . . . are future frames. If it is assumed, for sake of simplicity, that the estimates are still the same predicted values from FIG. 2, then FIG. 6 obtains. The ordinate value from 0. to 0.25 is the contribution due to Frame 3 whereas the ordinate value from 0.25 to 1.0 is due to Frame 4. An alternating sequence of upper and lower rate bounds is computed as follows: {0.333, 0.25, 0.57, 0.5}. A graph of these bounds is also depicted in FIG. 4, in the column labeled "Bound Sequence 3." As a result of this estimation procedure, there is a violation of the "upper>lower" constraint by the introduction of the fourth sequence number, that is, lower bound 0.5 associated with the fourth sequence number jumps above the upper bound 0.333 associated with the first sequence number. A new series of events is triggered upon locating this constraint violation, namely: bound computations for this sequence are terminated; the smallest upper bound of 0.333 is selected; and a time to make a new estimate, t=3.0 is determined. The new rate of 0.333 lasts from 2.25 to 3.0 secs., as shown on the abscissa of FIG. 6.

Figure 7:
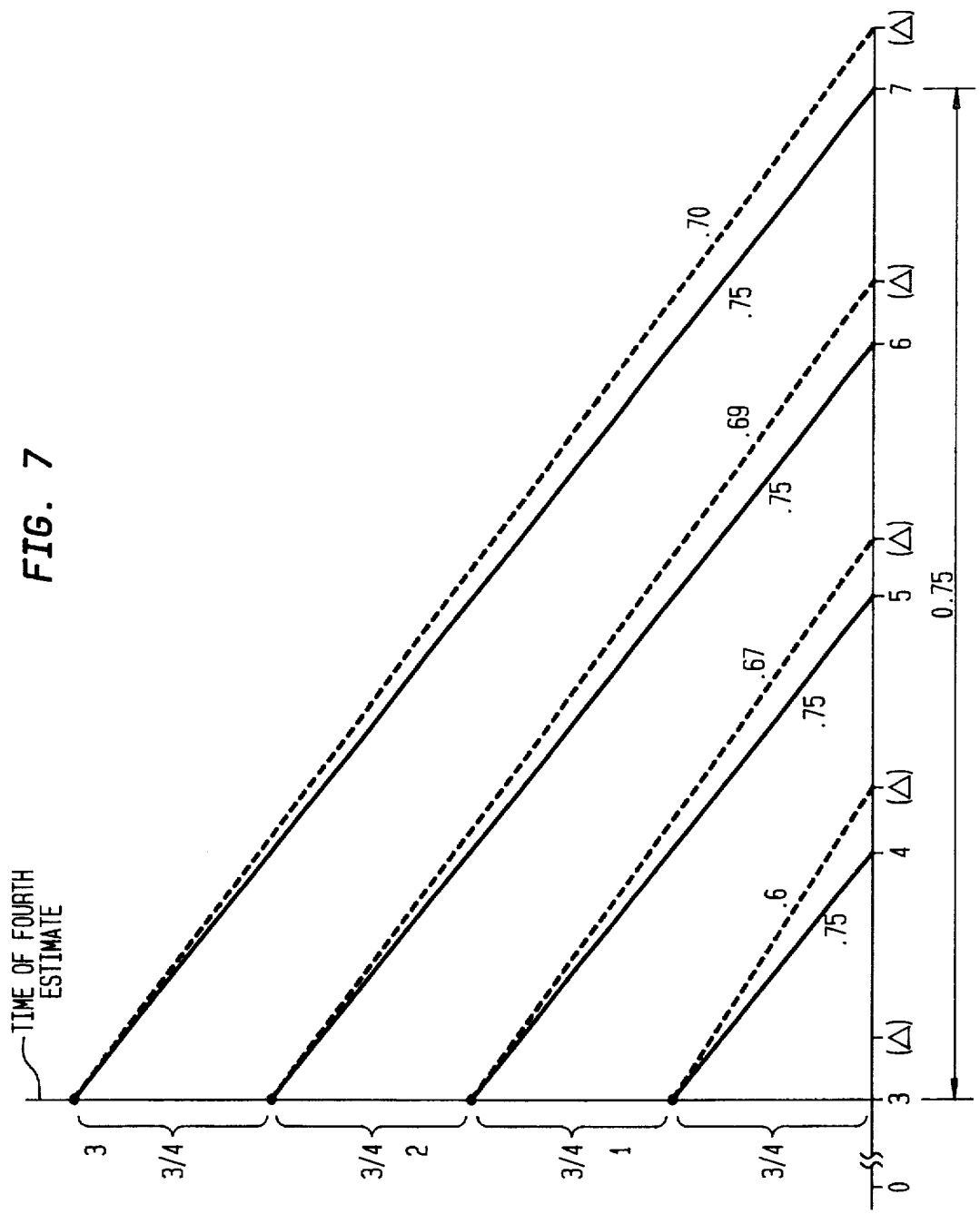
FIG. 7 is yet another rate diagram for a fourth estimation time depicting a graph of cells versus time, wherein the cells are from frames accumulated as a result of estimating future frame size based on past and present frame content.

Both violations of the "upper falling below lower" and "lower jumping over upper" types have been elucidated above. To complete this example, one other possible situation is covered. This situation occurs if the duration over which estimations are made is limited to a fixed number of frames. It is possible that over this fixed number of frames that no violations will occur. To demonstrate this situation, the rate diagram of FIG. 7 is now considered. If it is assumed that Frames 5,7,6 from FIG. 2 are identical to Frame 4, that is, K cells/sec. are propagated for ¾ of the frame duration, then FIG. 7 is the rate diagram corresponding to the time instant t=3.0—the time point of the next estimation—for four frame durations. The alternating sequence of upper and lower bounds is as follows: {0.75, 0.6, 0.75, 0.67, 0.75, 0.69, 0.75, 0.70}. A graph of these bounds is shown as "Bound Sequence 4" in FIG. 4. For the duration covered estimates for four frame intervals, no violations of "upper>lower" occur. To satisfy the bounds, the "least" upper bound of 0.75 may be chosen as the rate from 3.0 to 7.0 secs. Another alternative is to choose the "greatest" lower bound of 0.7 as the rate from 3.0 to 7.25 secs. A third choice would be to choose any value between the least upper bound and the greatest lower bound (say, for example, the average of the "least" upper and the "greatest" lower (0.725=(0.75 +0.7)/2) from 3.0 to 7.138 secs.). Indeed, in actual implementations, a secondary tie-breaking criterion will be used, as presented in the theoretical section below. That specific tie-breaking rule is only an example of a sensible choice. It must be noted that in actual implementations, for two reasons, the smoothing algorithm will be run before the time-interval for which in theory the decision was made has elapsed: If the tie breaking rule was used, the smoothing algorithm is re-run as soon as one more forecast becomes available. Even if the tie-breaking rule is not used, the smoothing algorithm is re-run because old forecasts get updated and almost surely get changed in the process. All of these choices are further discussed in the theoretical section below. In FIG. 7, the "least" upper bound choice is shown from 3.0 to 7.0 secs.

Figure 8:
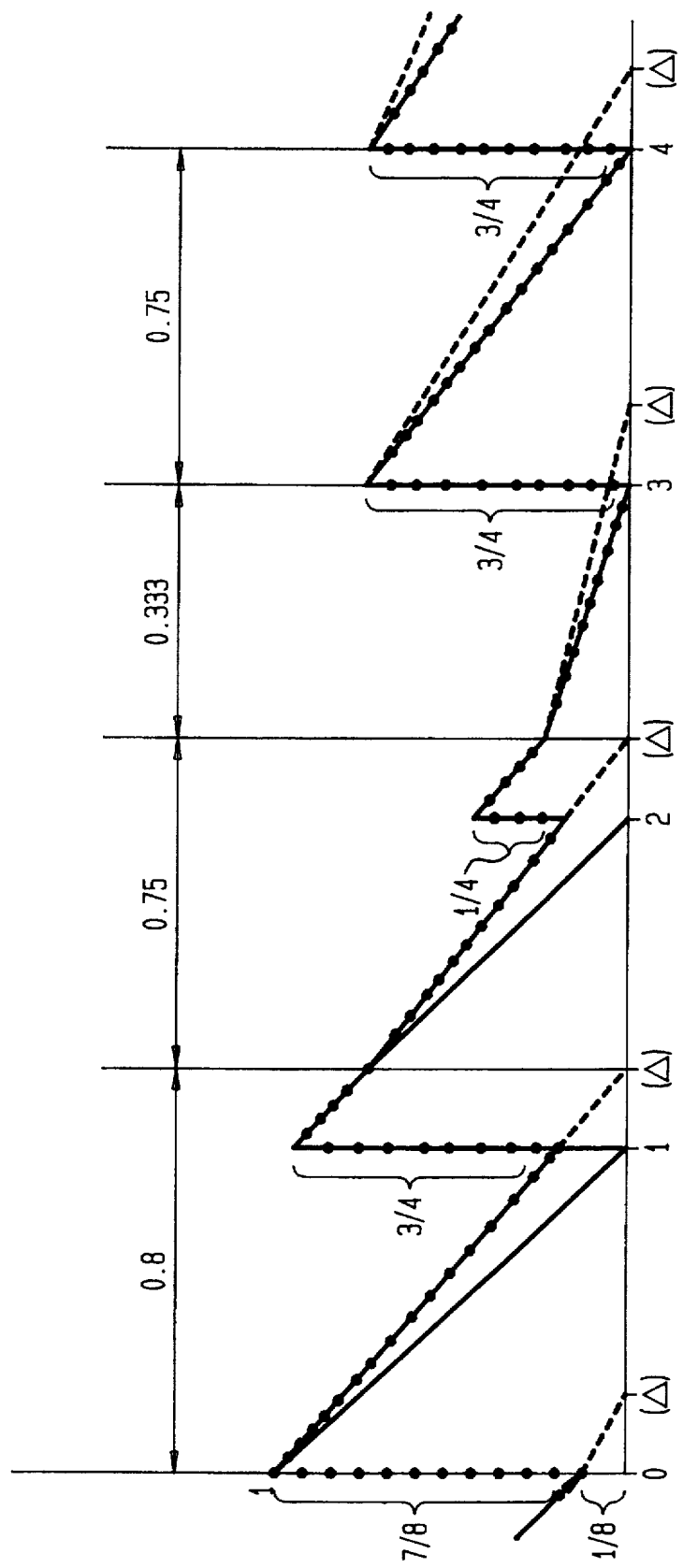
FIG. 8 is a rate versus time diagram for the illustrative example.

The graph of FIG. 8 summarizes the rate information for the example as generated above for Frames 1,2,3 and part of Frame 4. The abscissa is normalized time. In the ordinate direction, at t=0, the ordinate value of 1.0 represents the combined contribution of the residual cells of ⅛ and the ⅞ cells actually arriving in Frame 1. These accumulated cells amounting to one unit are transported by interface buffer 137 at the rate of 0.8 for 0.≦t≦1.25, so at t=1.0 there are 0.2 cells remaining. The cells of Frame 2 arrive at t=1.0 and provides ¾ cells, so the ordinate jumps from 0.2 to 0.95 at t=1.0. Cells are transported at the rate 0.8 from t=1.0 to t=1.25, so that t=1.25, there are 0.75 cells remaining to be cleared from buffer 127. At t=1.25, the rate changes from 0.8 to 0.75; this new rate continues up to t=2.25. At t=2.0, the cells of Frame 3 arrive and the ordinate jumps from 3/16 to 7/16. The rate of 0.75 continues for another 0.25 seconds, so that at t=2.25, the ordinate value is ¼. At this instant, the new rate of ⅓ takes over for 2.25≦t≦3.0. Just prior to the instant t=3.0, the ordinate is approaching 0., but just after the instant t=3.0, Frame 4 starts contributing cells amounting to ¾. Moreover, the rate changes to 0.75 in the interval 3.0≦t≦7.0, so all the cells existing at t=3.0 are cleared by t=4.0; similarly, all the cells existing just after t=4.0 are cleared by t=5.0, and so forth. The dotted line shows the trace of the cell propagation as either the upper bound or lower bound is traversed during each frame duration.

Figure 9:
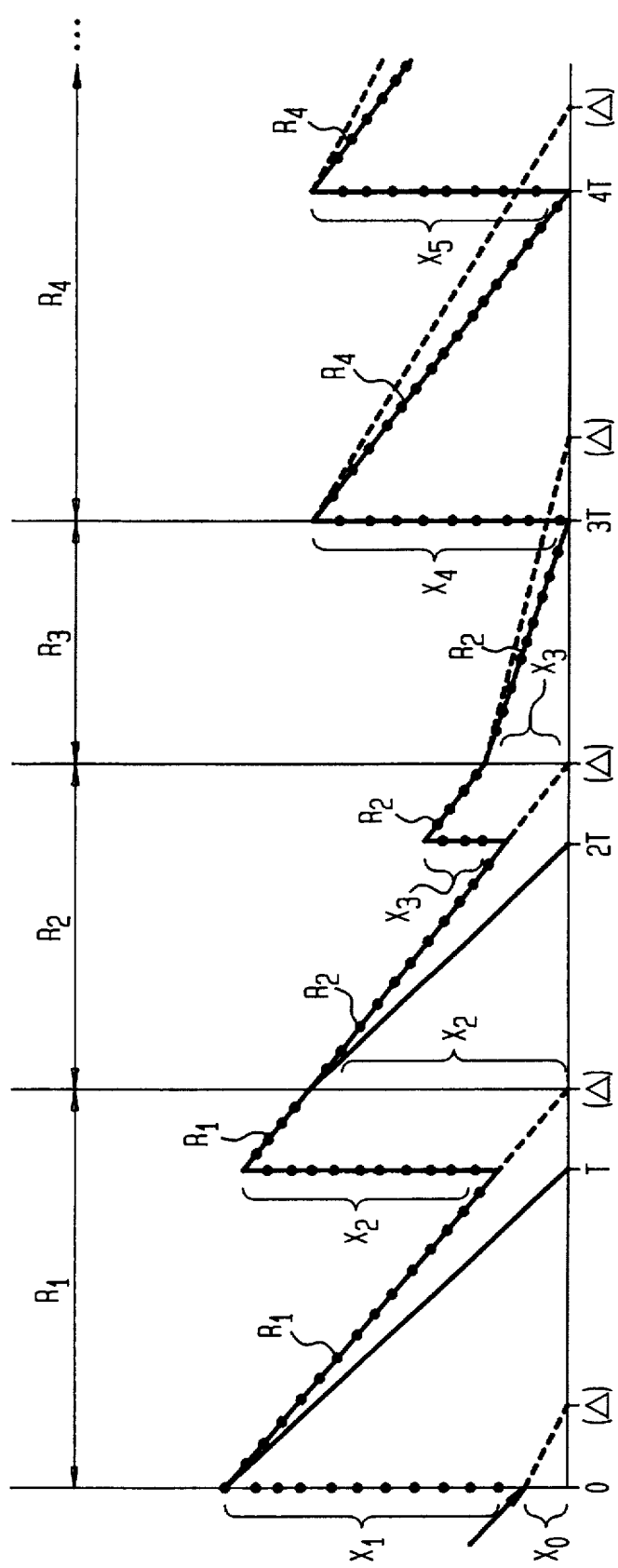
FIG. 9 is a generalized rate versus time diagram corresponding to the diagram of FIG. 8 used to introduce notation and terminology.

The graph of FIG. 9 is a generalized representation of FIG. 8 in that the quantities are shown unnormalized and a notation is introduced to be used shortly in the *theoretical* section. In particular, the frame cell information is now shown as $X_1$ for the frame from 0≦t≦T, $X_2$ for the frame from T≦t≦2T, $X_3$ for the frame from 2T≦t≦3T, and so forth. Moreover, the rates over each estimation interval are shown as $R_1$, $R_2$, and so forth. The residual is denoted as $B_0$.

THEORETICAL BASIS

1. Introduction

The theoretic basis is postulated as one of optimally smoothing traffic in an Asynchronous Transfer Mode (ATM) network when there is a constraint on the delay from arrival of a bit until being sent out, as part of a cell, into the ATM. It is a given that recent behavior of the input stream of bits into the ATM can be used, admittedly somewhat imperfectly, to predict the behavior of the input stream in the near future. The circuit arrangement depicted in FIG. 1 is representative of the ATM network to which the analysis applies.

In the ATM application under consideration, time is naturally slotted (e.g., in correspondence to frame boundaries) and slot n (n ∈ {1, 2, 3, ... }) runs from time (n−1)D to time nD, as was depicted in FIG. 2 for D normalized to one unit of time. The delay constraint is that all bits arriving in timeslot n (in the time interval [(n−1)D, nD] must be propagated to the ATM (element 135 of FIG. 1) at time nD+Δ at the latest.

In variable bit rate video, all bits of the n-th frame will arrive at the ATM interface in the time interval [(n−1)D, nD), and the delay constraint says that the last bit of the n-th frame must be transmitted at or before time nD+Δ. If the last bit of frame n is always transmitted at exactly time nD+Δ, and all cells have identical delays in the network, then the decoder (such as element 130 of FIG. 1) at the destination side always gets a new frame to decode exactly one frame interval (D) after the previous frame. The delay constraint used is therefore particularly suitable for VBR video.

Let $X_n$ denote the amount of data (in bits, say) entering the ATM during the n-th slot (i.e., $X_n$ is the size of the n-th frame). Also, for $(n-1)D \leq t \leq nD$, let $Y(t)$ denote the amount of data entering the ATM in the time interval $[t, nD)$. Then $$X_n = Y(n-1). \tag{1.1A}$$

For simplicity of notation, it is assumed that bits arriving at the ATM at time t do not enter the buffer (element 120 of FIG. 1) until "right after" time t. For example, this implies that all bits in the buffer at time t=nD arrived before time nD. These bits are from frame n (or an earlier frame), and must be sent out at time nD+Δ at the latest. Equation (1.1A) can be generalized, in which case (1.1A) becomes $$X_n = \lim_{t \downarrow n-1} Y(t). \tag{1.1B}$$

$X_n$ and $Y(t)$ are in numbers, for example, of bits. For the video system under consideration, it is convenient to instead express $X_n$ in terms of ATM cells. $Y(t)$ is then prorated accordingly and can have fractional values. Also, the content of buffer 120, denoted $C(t)$ at time t, is then expressed in cells and can have fractional values.

The smoothing scheme must compute, at any time t, a decision variable R(t) where R(t) is the rate of sending out ATM cells at time t. The goal is to keep R(t) as close to constant as possible without violating delay constraints—i.e. the objective in smoothing is to determine R(.) in such a way that it is as close to constant as possible and such that the delay requirement "nD+Δ" is satisfied. In sub-sections below, two smoothing rules, called the "Δ-Smoothing Rule" and the "Enhanced Δ-Smoothing Rule" are described, and it is shown under what circumstances these rules indeed achieve the smoothing objective.

In an implementation of the smoothing scheme, there is no need to compute R(t) more frequently than the times at which cells are present to be transmitted. In this case, at any time t ∈ [(n−1)D, nD) that a cell is to be transmitted, R(t) is computed. This R(t) value is based on the buffer content C(t) at time t, and forecasted values for $Y(t)$ and $X_{n+1}, X_{n+2}, \ldots$. Once R(t) is determined, the cell to be transmitted is scheduled to be transmitted at time $t+R(t)^{-1}$.

While in reality video connections are restricted to a finite duration, it is convenient to base the scheduling on the assumption that the connection will continue to remain open, with the same statistical behavior of the source, for an unlimited amount of time. This allows the conjecture that the series $X_n$, n=1,2 3, . . . is a time series $(X_n)^\infty_{n=1}$. For the Δ-Smoothing Rule to be well defined and realizable in a physical sense, the following constraint is imposed:

$$\lim_{n \to \infty} \frac{1}{n^2} \sum_{k=1}^{n} X_k = 0. \tag{1.2}$$

For VBR video, the sequence $(X_n)^\infty_{n=1}$ is a bounded sequence, so that (1.2) holds. In other applications $(X_n)^\infty_{n=1}$ might be a time series for which $$\lim_{n \to \infty} \frac{1}{nD} \sum_{k=1}^{n} X_k = A \text{ exists}, A < \infty, \tag{1.3}$$

where A is the average cell-rate (cells per second) of the source. In this case also (1.2) is guaranteed to hold.

If it is assumed that the amount of work Y(t) (for (n−1)D≤t≤nD) arriving during [t, nD] is distributed over this interval in such a way that for the service rate function R(.) chosen by the Δ-Smoothing Rule, whenever the buffer empties at time τ∈[(n−1)D, nD), then Y(τ)=0. This will be considered in further detail below where it will be shown that this is a reasonable assumption for VBR video. To simplify notation, it is assumed that D=1.

In describing the algorithm, the number of cells sent out during the time interval [0, t] is then, as a first approximation, $$\left\lfloor \int_0^t R(\tau) \, d\tau \right\rfloor \text{(integral part)}. \tag{1.4}$$

Because of an occasional need to send out only a partially utilized cell, the actual number of cells sent out during [0, t] may be somewhat larger. This effect is expected to be negligible and will be disregarded. If it always possible to include this effect in the computations if necessary.

2. The Δ-Smoothing Rule

In this sub-section, it is assumed that the sequence $(X_n)^\infty_{n=1}$ and the function $(Y(t))_{t \geq 0}$ (with $Y(n-1)=X_n$) are completely known in advance, that is, it is possible to perfectly forecast the traffic flow. Later, the case of imperfect forecasts is considered. For this case, the "Δ-Smoothing Rule" is first formulated, which only *aims* to satisfy the delay criteria. In the next sub-section, the "Enhanced Δ-Smoothing Rule" is then formulated, which indeed optimally smooths the traffic, subject to the delay constraints.

The Δ-smoothing rule maintains R (.) as close to constant as possible by using the following strategy for computing R(.) values. A sequence of upper and lower bounds on rates are first computed and then the optimal rate is chosen using the Δ-smoothing rule. The upper bounds are computed using the idea that if the transmission rate is too high then the buffer will go empty and the link (element 121 of FIG. 1) will become idle. This causes variability in the output traffic. The lower bounds are computed based on the idea that if the transmission rate is too low, then delay constraints are violated. To compute sequences of upper and lower bounds, 1-step, 2-step, 3-step, etc forecasts are used. A step is typically a frame interval but it need not be so. The sequence of bounds may (in theory, in practice this is extremely unlikely) be such that every lower bound is less then every upper bound. In that situation, transmission constantly at the average input rate may take place. The sequence of bounds may be such that the largest lower bound may be smaller than the smallest upper bound. Then just the average input rate is used for transmission. However, this is likely to be the exception rather than the rule. Usually, the sequence of upper and lower bounds cross. The Δ-smoothing rule prescribes how the rates are to be chosen in this case.

Now, consider t such that n−1≤t≤n, i.e. n−1=[t] (integral part). With D=1, $X_n$ is the amount of work arriving during

[n−1, n), Y(t) is the amount of work arriving during [t, n), and C(t) is the buffer contents at time t, define:

$$L_j(t) = \max_{0 \leq 1 \leq j} \left( \frac{C(t) + Y(t) + \sum_{k=1}^{1} X_{n+k}}{n - t + 1 + \Delta} \right), \quad (2.1)$$

$$U_j(t) = \min_{0 \leq 1 \leq j} \left( \frac{C(t) + Y(t) + \sum_{k=1}^{1} X_{n+k}}{n - t + 1} \right), \quad (2.2)$$

both for j=0, 1, . . . . (In the Illustrative Example sub-section, these were the bounds computed with respect to FIGS. 3, 5, 6, and 7 and plotted in FIG. 4.) An equivalent way of defining $L_j(t)$ and $U_j(t)$ is by $$L_0(t) = \frac{C(t) + Y(t)}{n - t + \Delta}, \quad (2.3)$$

$$L_j(t) = \max \left( L_{j-1}(t), \frac{C(t) + Y(t) + X_{n+1} + \ldots + X_{n+j}}{n - t + j + \Delta} \right) \quad (2.4)$$

for $j \geq 1$, $$U_0(t) = \frac{C(t) + Y(t)}{n - t}, \quad (2.5)$$

$$U_j(t) = \min \left( U_{j-1}(t), \frac{C(t) + Y(t) + X_{n+1} + \ldots + X_{n+j}}{n - t + j} \right) \quad (2.6)$$

for $j \geq 1$. Hence:

$$0 \leq L_0(t) \leq L_1(t) \leq \ldots \leq L_{j-1}(t) \leq L_j(t) \leq \ldots \quad (2.7)$$

$$U_0(t) \geq U_1(t) \geq \ldots \geq U_{j-1}(t) \geq U_j(t) \geq \ldots \quad (2.8)$$

In this notation, L values correspond to lower bounds on the rates and the U values correspond to upper bounds. If t is integer, take *left* limits as the values of $L_j(t)$ and $U_j(t)$, so that $$L_j(n) = \max_{0 \leq 1 \leq j} \left( \frac{C(n) + \sum_{k=1}^{1} X_{n+k}}{1 + \Delta} \right), \quad (2.9)$$

$$U_j(n) = \max_{0 \leq 1 \leq j} \left( \frac{C(n) + \sum_{k=1}^{1} X_{n+k}}{1} \right). \quad (2.10)$$

The analog of (2.3)–(2.8) still holds, with $$L_0(n) = \frac{C(n)}{\Delta}, \quad U_0(n) = \frac{C(n)}{0} = \infty \text{ (usually)}. \quad (2.11)$$

The reason for the left-continuous choice (2.9)–(2.11), which seems to go counter to the choice of [n−1, n) as the basic building block of the timeline, will be given below. As a result, the Δ-smoothing rule distinguishes two cases (and the second case is divided into subcases). In each case, or subcase, a different prescription is given for R(t). The two cases are:

Case A. $L_j(t) < U_j(t)$ for all $j \in \{0, 1, \ldots\}$ (2.12)

and

Case B. There is a $j \in \{0, 1, \ldots\}$ with $L_j(t) \geq U_j(t)$. (2.13)

In case B, there is of course a smallest j with property (2.13). This minimal j is denoted by I(t).

In fact case B is the normal situation. The prescription for R (t) fostered by the Δ-Smoothing Rule is now given in the form of Results. The next Result takes care of the exceptional case (2.12).

Result 2.1. If (2.12) above holds then $$\lim_{j \to \infty} L_j(t) = \lim_{j \to \infty} U_j(t) = \lim_{n \to \infty} \frac{1}{n} \sum_{k=1}^{n} X_k = A, \quad (2.14)$$

where A is the average rate (in cells per second) of the source being served, and if $$R(\tau) = A \text{ for all } \tau \geq t \quad (2.15)$$

then all work arriving before time $k \in \{n, n+1, \ldots\}$ will always be served by time $k + \Delta$, and the buffer will almost never go empty during the time interval [t, ∞). (The flowrate A will never be stopped because of an empty buffer).

To handle case (2.13), it is now shown how this case divides in a very natural way into three subcases. Of these only two are significant:

Result 2.2. If (2.13) holds and I(t) is the minimal index j, then the following obtains:

(i) $I(t)=0$ and $C(t)+Y(t)=0$ (2.18)

(ii) $I(t) \geq 1$, $L_{I(t)-1}(t) < U_{I(t)-1}$, and $L_{I(t)}(t) \geq U_{I(t)}(t)$. (2.19)

For case (2.18), choose $$R(\tau) = 0 \text{ for } t \leq \tau < n. \quad (2.20)$$

From equation (2.19), two subcases follow: either $$L_{I(t)-1}(t) < U_{I(t)-1}(t) = U_{I(t)}(t) \leq L_{I(t)}(t) = \quad (2.21)$$

$$\frac{C(t) + Y(t) + X_{n+1} + \ldots + X_{n+I(t)}}{n - t + I(t) + \Delta} <$$

$$\frac{C(t) + Y(t) + X_{n+1} + \ldots + X_{n+I(t)}}{n - t + I(t)},$$

or $$\frac{C(t) + Y(t) + X_{n+1} + \ldots + X_{n+I(t)}}{n - t + I(t) + \Delta} < \quad (2.22)$$

$$\frac{C(t) + Y(t) + X_{n+1} + \ldots + X_{n+I(t)}}{n - t + I(t)} =$$

$$U_{I(t)}(t) \leq L_{I(t)}(t) = L_{I(t)-1}(t) < U_{I(t)-1}(t).$$

The following two Results prescribe how to choose R (t) in the two cases (2.21), (2.22).

Result 2.3. If (2.21) holds, let k be the smallest index j with $U_j(t) = U_{I(t)}(t)$. Then the selection $$R(\tau) = U_{I(t)}(t) = U_k(t) \text{ for } t \leq \tau < n + k \quad (2.27)$$

is made, and this leads to $$C(n+k) = 0. \quad (2.28)$$

Moreover, this assignment is optimal: any increase of R(.) over the time interval [t, n+k] creates buffer emptiness and increased variability of R(.) in that interval. On the other hand, the average value of R(.) over the interval [t, n+k] is at most $U_k(t)$, while the average value of R(.) over the interval [t, n+I(t)+Δ] is at least $L_{I(t)}(t) \geq U_k(t)$. Hence any decrease of R(.) over [t, n+k] creates increased variability in R(.).

Result 2.4. If (2.22) holds, let k be the smallest index j with $L_j(t) = L_{I(t)}(t)$.

Then $$k + \Delta \leq I(t) \quad (2.29)$$

and choose $$R(\tau) = L_{J(t)}(t) = L_k(t) \text{ for } t \leq \tau < n+k+\Delta. \quad (2.30)$$

With this choice, the work arriving in [n+k−1, n+k) will be completed exactly at time (n+k+Δ).

Moreover, this assignment is optimal: any decrease of R(.) over the time interval [t, n+k+Δ) will cause a violation of a delay constraint. On the other hand, the average value of R(.) in the interval It, n+k+Δ) is at least $L_k(.)$ and the average value of R(.) in the interval [t, n+I(t)) is at most $U_{J(t)}(t) \leq L_k(t) + L_{J(t)}(t)$. Hence any increase of R(.) over the interval [t, n+k+Δ] will increase variability.

In the Δ-smoothing rule as developed thus far, for n−1<t<min(n, n−1+Δ), the rule does not "know" what part of C(t) dates from before time n−1 and must be completed at time n−1+Δ or before, and what part dates from after time n−1 and only needs to get done by time n+Δ.

If n−1<t<min(n, n−k+Δ) (k≤n−1, integer) it is apparent that some work in the buffer may date back to before time n−k and must get done at n−k+Δ at the latest, whereas other work may be from after time n−1 and only needs to get done by time n+Δ. The reason, for t integer, that $L_j(t)$ and $U_j(t)$ are chosen as in (2.9), (2.10), is because this choice alleviates this problem. For t integer, the rule "remembers" that all work in the buffer at time t should be completed by time t+Δ.

Of course, for t=n+ε, ε>0 but small, the rule assumes that all work, if necessary, can be delayed until n+1+Δ, and smooths accordingly. There are easily implementable variations on the Δ-Smoothing Rule which recompute R(t) only if t is integer or of the form t=k+Δ, k integer, keep R(.) constant in between those points, and which satisfies the delay constraint "n+Δ" for 0<Δ≤1. The "Enhanced Δ-Smoothing Rule" described in the following sub-section is an enhanced solution and works perfectly even if Δ>1.

2.1 The Enhanced Δ-Smoothing Rule

In this sub-section, there is derived additional results for the case of VBR video still in the hypothetical situation that future offered traffic is perfectly known. In the next sub-section, there is considered the case where the forecasted values of $X_n$ and Y(t) are not perfect. Several modifications to the basic smoothing scheme presented in the sub-section above are also discussed.

*Definition* 2.1. For t≥0:

$$Q(t) = \max_{\substack{t-\Delta<k \leq t \\ k \text{ integer}}} \frac{\left(C(k) - \int_k^t R(\tau) \, d\tau\right)^+}{\Delta - (t - k)} \quad (2.31)$$

In the "Enhanced Δ-Smoothing Rule", the R(t) from the Δ-Smoothing Rule, now designated R*(t), is first computed and then used in the following rate computation:

$$R(t) = \max(R^*(t), Q(t)). \quad (2.32)$$

The rule works as follows: when there is a large amount of work anticipated in the near future then R(t)=R*(t)>Q(t). The recommended transmission rate is high so that buffer contents are emptied quickly to prepare for the anticipated high arrivals. If the anticipated number of arrivals for the near future is small then R(t)=Q(t)>R*(t). This lower rate is chosen to be sufficient to transmit contents in the buffer with an active delay constraint. Hence, if R(t)=R*(t)>Q(t) then R*(t) will tend to remain constant while Q(t) will tend to decrease, while if R(t)=Q(t)>R*(t) then Q(t) will tend to stay constant while R*(t) will tend to decrease.

It is interesting to note that the k for which the maximum is achieved in (2.31) changes only at integer values of t or at values of t of the form t=k+Δ. This observation leads to the following:

*Result* 2.5. The flowrate function R(.) generated by the Enhanced Δ-Smoothing Rule has the property that R(.) can change value only for t integer and t of the form t=k+Δ, k integer. If Δ is not integer then for integer values of t, say t=n, R (.) can only increase, in that case $$\lim_{\tau \uparrow n} C(\tau) + Y(\tau) = 0, X_{n+1} > 0, \quad (2.33)$$

while for t of the form t=k+Δ, R(.) can only decrease, in that case work arriving in [k−1, k) gets done exactly at time k+Δ=t.

3. Variable Bit Rate Coded Video

When applying the smoothing scheme to VBR video the basic scheme has to be enhanced to take into account requirements of VBR video. For VBR video, there is a bound, $R_{max}$, on $X_n$—i.e. there is an $R_{max}<\infty$ with $$X_n \leq R_{max} \text{ for all } n. \quad (3.1)$$

This $R_{max}$ is either the maximum number of cells that a coder can generate for a frame or is the transmission rate from the coder to the smoother. Another important factor for VBR video is the nature of Y(t) and the pattern of arrival of cells from the coder to the smoothing device in the interframe interval. This pattern depends on the coder—i.e. the manner in which bits are generated, buffered, and transmitted by the coder. There are two extreme possibilities. One is that the coder generates all the bits for a frame very fast (a very small fraction of the interframe interval) and then transmits this information at the peak rate to the ATM network interface. Once all the bits are transmitted, the coder does not transmit any bits until the next frame. The second possibility is for the coder to transmit bits such that the corresponding cells are equally spaced during the interframe interval. It is extremely unlikely that the coder will actually send according to this pattern, but the smoother can handle this behavior by buffering, for every frame, the cells from that frame and transmit them 'equi-distributed' during the next frame interval, while the cells of that frame are being generated (and buffered). However, this introduces a delay of one frame at the source. In practice, Y(t) will have a distribution in between these two extremes. Some restrictions on Y(t) are needed to be able to meet delay constraints (since the output rate is also bounded). Another problem that has to be dealt with is that of imperfect forecasts. Since the delay constraints cannot be violated, it is necessary to ensure that the rates chosen using imperfect forecasts do not lead to a situation where even transmission at the peak rate results in delay violations. Subsequent discussion describes an illustrative technique to prevent this from happening.

The following Result describes what happens when the Enhanced Δ-Smoothing Rule is used for VBR video.

*Result* 3.1. For VBR video, if there is a non-integer value t such that $$\frac{C(t) + Y(t)}{\lceil t \rceil - t + \Delta} \leq R_{max}, \quad (3.2)$$

or an integer value t, say t=n, such that $$\frac{C(n)}{\Delta} \leq R_{max} \quad (3.3)$$

then (3.2) holds for all non-integer τ≥t, and for all integer k≥t it may be shown that $$\frac{C(k)}{\Delta} \leq R_{max} \text{ and } \frac{C(k) + X_{k+1}}{\Delta + 1} \leq R_{max}. \quad (3.4)$$

Moreover, for all $\tau \geq t+\Delta$ then $$R(\tau) \leq R_{max}. \quad (3.5)$$

For VBR video, if the coder transmits generated cells immediately at the peak rate then it is possible to come very close to the situation where for $n-1 \leq t < n$:

$$X_n - Y_t = \min((t-(n-1))R_{max}, X_n), \quad (3.6)$$

i.e. input occurs at rate $R_{max}$ until $X_n$ cells are delivered, then input stops until time n.

The usefulness of Result 3.1 is because in any practical application there is always a bound on the output transmission rate. This bound on the transmission rate is the peakrate of the ATM virtual circuit carrying the cells. For VBR video, this peakrate is likely to be $R_{max}$, so that the ATM interface can indeed handle a sequence of maximum size frames. Result 3.1 shows that the Enhanced $\Delta$-Smoothing Rule will always choose R (t)$\leq R_{max}$ for all t, so that for the ease of perfect forecasts there is no need to put in a separate constraint ensuring that this holds. For imperfect forecasts, additional mechanisms are necessary because the sequence of upper and lower bounds from which the smoothing scheme picks the rate are entirely dependent on the accuracy of the forecasts. With imperfect forecasts, the lower bound may not be high enough (because large arrivals may not be anticipated correctly). In this case, the algorithm may at some time not be able to meet delay constraints without transmitting at rates greater than $R_{max}$. Hence, additional mechanisms are necessary to prevent this situation as presented in the next section.

3.1 Forecasts

There is a large body of literature and knowledge on how to use time-series analysis as a mathematical forecasting algorithm to extract forecasts of future frame sizes from knowledge of past and present frame sizes (e.g. Box and Jenkins, *Time Series Analysis, Forecasting and Control*, Holden, 1976). In actual implementations, model parameters would need to be periodically or continuously re-estimated to be able to react to slowly varying traffic characteristics. The following section gives an example of how this can be accomplished in an engineering setting. The basic model assumed in that section is an AR(1) model (autoregressive of order one). Similar engineering implementations can be done for more complicated models. More importantly, the section below shows how the smoothing scheme can take into consideration the fact that forecasts are inherently less than perfect.

4. Methodology Details

When implementing the smoothing scheme, a number of details have to be considered. These are now explained. In this subsection, the notation is changed to a more general case than that used in the last sub-section. Instead of considering a sequence of equally spaced points in time $n_1, n_2, \ldots$ (corresponding to normalized frame intervals), an increasing sequence of points in time is considered, $T_0 < T_1 < T_2 < T_3 < \ldots$. The source under consideration sends information that generates $X_k$ cells between epochs $T_{k-1}$ and $T_k$. Information before time $T_k$ and information after time $T_k$ cannot be combined into the same cell. At the receiving end, information from the interval $(T_{k-1}, T_k)$ must be available before the information can be utilized. To represent delay constraints a sequence of deadlines is used $D_1, D_2, \ldots$. It is assumed that for every k there is a deadline $D_k$ such that all cells containing information that arrived in $(T_{k-1}, T_k]$ must be transmitted by time $D_k$ at the latest.

Let $Z_n(t)$ denote the number of cells to be generated in the time interval (t,Tn] if $T(n-1) < t \leq Tn$. Also, for the same t and n, let $Y_n(t)$ denote the number of cells generated in the interval (T(n-1), t]. At time t, $Y_n(t)$ is perfectly known, while $Z_n(t)$ may or may not be perfectly known (at least is not perfectly known all the time for imperfect forecasts). The implementation problems are:

(A) Forecasts for $Z_n(t)$, and $X_{n+k}$ (k=1, 2,. . .) are not perfect.

(B) If the $Z_n(t)$ cells arriving in (t, n] tend to be concentrated towards the end of the interval, rate R(t) as chosen by the smoothing rule may not be maintainable because the buffer may become empty before time n.

(C) The recommended output rate R(t) after arrivals at the end of the interval could be larger than the maximal allowed output rate $R_{max}$. This is because a large number of arrivals at the end of the interval implies that all these arrivals have to be transmitted in a much shorter time.

(D) While the rate R(t) chosen using the smoothing rule will satisfy delay constraints for work still (if forecasts are perfect) to arrive, it gives no guarantee for old cells already in the buffer.

Of these problems, case D is easily taken care of as follows. It is required that a new rate R (t) be computed for at least all $t \in T_1, T_2, \ldots$ (and possibly, some more time epochs). For these epochs $T_n$, a minor modification of the defining equations for the upper and lower bounds is made.

$$U_0(T_n) = +\infty \ (U_0(T_0) = 3 R_{max} \text{ satisfies}), \quad (4.1)$$

$$L_0(T_n) = \frac{C(T_n)}{D_n - T_n}, \quad (4.2)$$

$$U_k(T_n) = \min_{0 \leq j \leq k} \left( \frac{C(T_n) + X_{n+1} + \ldots + X_{n+j}}{T_{n+j} - T_n} \right), \quad (4.3)$$

$$L_k(T_n) = \max_{0 \leq j \leq k} \left( \frac{C(T_n) + X_{n+1} + \ldots + X_{n+j}}{D_{n+j} - T_n} \right), \quad (4.4)$$

where $X_{n+i}$, $T_{n+i}$ and $D_{n+i}$ may be replaced by forecasts.

The simplest way to ensure that all delay constraints are satisfied is to require that $$R(\tau) \geq R(T_n) \text{ for } T_n \leq \tau \geq D_n. \quad (4.5)$$

In situations of practical interest, then $$T_n < D_n < T_{n+1}$$

for all n, so that at any time $\tau$ there is at most one constraint of type (4.1). Constraint (4.5) can be dropped at time $\tau$, $T_n \leq \tau \leq D_n$, if the buffer has been empty at any point in time $\tau^*$, $T_n \leq \tau^* \leq \tau$.

The problems described in cases A, B, C above are harder to handle. Solutions to these will be discussed in the following subsections.

5. Imperfect Forecasts

Because of the constraint that the actual output rate (from the buffer into the ATM network) is at most $R_{max}$, an unpredicted increase in the input rate, if detected too late, can lead to delay constraints being violated. To prevent this from happening, a $\Delta > 0$ is first found with the property that $$D_n - T_n \geq \Delta \text{ for all } n.$$

Since $D_n$ is chosen by the system, choose $D_n - T_n$ constant (independent of n) and choose $\Delta$ equal to this constant.

Delay constraints are met by increasing the output rate to $R_{max}$ whenever the number of cells in the buffer reaches $[\Delta R_{max}]$. Once the output rate is increased to $R_{max}$, it is kept at this value for some time. Later, rules to reduce the rate are discussed.

It is clear that this policy prevents violations of the delay constraints: Let the buffer constant reach $[\Delta R_{max}]$ at time t, $T_{n-1} < t < T_n$. At worst, both input and output occur at average rate $R_{max}$ during (t, $T_n$], so that $C(T_n) \leq [\Delta R_{max}]$ and by keeping the output at rate $R_{max}$ during $(T_n, T_n+\Delta]$ the delay constraint is satisfied.

Let $T_{n-1} < t < T_n$. Let $\overline{T}_{n+k}(t)$, $\overline{D}_{n+k}(t)$, $\overline{Z}_n(t)$, $\overline{X}_{n+k}(t)$ be the forecasts for $T_{n+k}$, $D_{n+k}$, $Z_n(t)$, $X_{n+k}$ available at time t. Because these forecasts are of limited accuracy, especially for k large, forecasts are limited to only the near future. The maximum k (future) for which forecasts are done is called the horizon and denoted by H. Now redefine the smoothing scheme to incorporate forecasts and limited horizons.

For $T_{n-1} < t < T_n$, $0 \leq k \leq H$, define $$L_k(t) = \max_{0 \leq j \leq k} \left( \frac{C(t) + \overline{Z}_n(t) + \overline{X}_{n+1}(t) + \ldots + \overline{X}_{n+j}(t)}{\overline{D}_{n+j}(t) - t} \right) \quad (5.1)$$

$$U_k(t) = \min_{0 \leq j \leq k} \left( \frac{C(t) + \overline{Z}_n(t) + \overline{X}_{n+1}(t) + \ldots + \overline{X}_{n+j}(t)}{\overline{T}_{n+j} - t} \right) \quad (5.2)$$

and if there exists a k, $1 \leq k \leq H$, with $$L_k(t) \geq U_k(t),$$

choose R(t) as in the previous subsection. Otherwise, choose R(t) according to some secondary rule, but such that $$L_H(t) \leq R(t) \leq U_H(t).$$

A "safe" secondary choice in this case is $$R(t) = U_H(t).$$

An alternative choice is the following:

First, compute an estimate µ(t) for the "current average cell rate". For example, if $T_{n-1} \leq t < T_n$, this can be done by using $$\mu(t) = \frac{\sum_{k=1}^{n-1} X_k}{T_{n-1}}.$$

Alternatively, µ(t) can be computed as follows: choose a c, $0 < c < 1$, $0 \leq 1-c << 1$, and let $$\mu_0 = R_{max}, \mu_k = c \mu_{k-1} + (1-c) \frac{X_k}{T_k - T_{k-1}},$$

$\mu(t)=\mu_{n-1}$ if $T_{n-1} \leq t < T_n$. The actual value of c is not very important. For coded video, with $T_n - T_{n-1}=40$ msec for all k, c=0.99 guarantees acceptable initialization within less than 2 seconds.

Now, use the following rule as a secondary rule:

$$R(t) = \begin{cases} U_H(t) \text{ if } L_H(t) < U_H(t) \leq \mu(t) \\ \mu(t) \text{ if } L_H(t) \leq \mu(t) \leq U_H(t) \\ L_H(t) \text{ if } \mu(t) \leq L_H(t) < U_H(t). \end{cases}$$

5.1 A Special Case

The following discussion contains specific details meant for situations of practical interest where µ(t) is small in comparison with $R_{max}$ (for example $$\mu(t) \approx \frac{1}{20} R_{max}).$$

Assume that at time $T_n$, the delay constraint $D_n$ is exactly known, and that $T_n < T_n + \Delta \leq D_n \leq T_{n+1}$.

In this situation a new rate R(t) is computed for $t \in T_0, T_1, T_2, \ldots$ and also at certain times in between. These in between computations are triggered by certain buffer states.

At time $t=T_n$, the method described before is used with (for $0 \leq k \leq H$)

$$L_k(T_n) = \max_{0 \leq j \leq k} \left( \frac{C(T_n) + \overline{X}_{n+1}(T_n) + \ldots + \overline{X}_{n+j} \cdot (T_n)}{\overline{D}_{n+j}(T_n) - T_n} \right) \quad (5.3)$$

$$U_k(T_n) = \min_{0 \leq j \leq k} \left( \frac{C(T_n) + \overline{X}_{n+1}(T_n) + \ldots + \overline{X}_{n+j} \cdot (T_n)}{\overline{T}_{n+j}(T_n) - T_n} \right) \quad (5.4)$$

In addition, depending on buffer states, the rate is modified at certain times in between.

(A) Whenever the buffer content goes up to $[\Delta R_{max}]$, i.e. whenever $C(t) \geq [\Delta R_{max}]$, the rate is immediately reset to $R_{max}$:

$$R(t)=R_{max}$$

and keep it at that rate for some time (at most until $T_{n+1}$, if $T_n < t < T_{n+1}$).

(B) Whenever the buffer goes empty, i.e. whenever C(t)= 0, the rate is reset to zero:

$$R(t)=0$$

and keep it at that rate for some time (at most until $T_{n+1}$, if $T_n < t < T_{n+1}$).

(C) Establish a "Lower Critical Level" LCL(t) (e.g. LCL(t)=[½∆µ(t)]) and whenever the buffer content increases from a value less than LCL(t) to a value greater than or equal to LCL(t), R(t) is reset using the smoothing algorithm described before (the rate is kept at this new level for some time).

Rules A and B above together guarantee satisfaction of the delay constraints. Rule C does some additional smoothing by preventing unnecessary periods with cells in the buffer but no output. Rule C will never be used in the situation where all input occurs at rate $R_{max}$, at the very beginning of the interval $(T_{n-1}, T_n]$.

6. Forecasts and Horizons

For coded video, $$T_k=kT, D_k=kT+\Delta.$$

Here, T is the interframe period. Since $0 < \Delta < T$, then $$T_k < D_k < T_{k+1}$$

and for perfect forecasts for $T_k$ and $D_k$. The framesizes $X_k$ can be forecast using $$\overline{X}_{n+k}(T_n)=\mu(T_n)+\rho^k(X_n-\mu(T_n))$$

where $\mu(T_n)$ is the "current average cell rate" of the source and $\rho \approx 0.98$. For small values of H, use $\rho=1.00$.

In complicated situations, it may be necessary to use:

$$\bar{X}_{n+k}(t) = \bar{X}_{n+k}(T_{n-1}) \text{ (if } T_{n-1} \leq t < T_n), \quad (6.1)$$

$$Z_n(t) = \frac{T_n - t}{T_n - T_{n-1}} \bar{X}_n(T_{n-1}) \text{ (if } T_{n-1} \leq t < T_n). \quad (6.2)$$

$$Z_n(t) = \frac{T_n - t}{t - T_{n-1}} Y_n(t) \quad (6.3)$$

7. Implementation of Smoothing Technique

Figure 10:
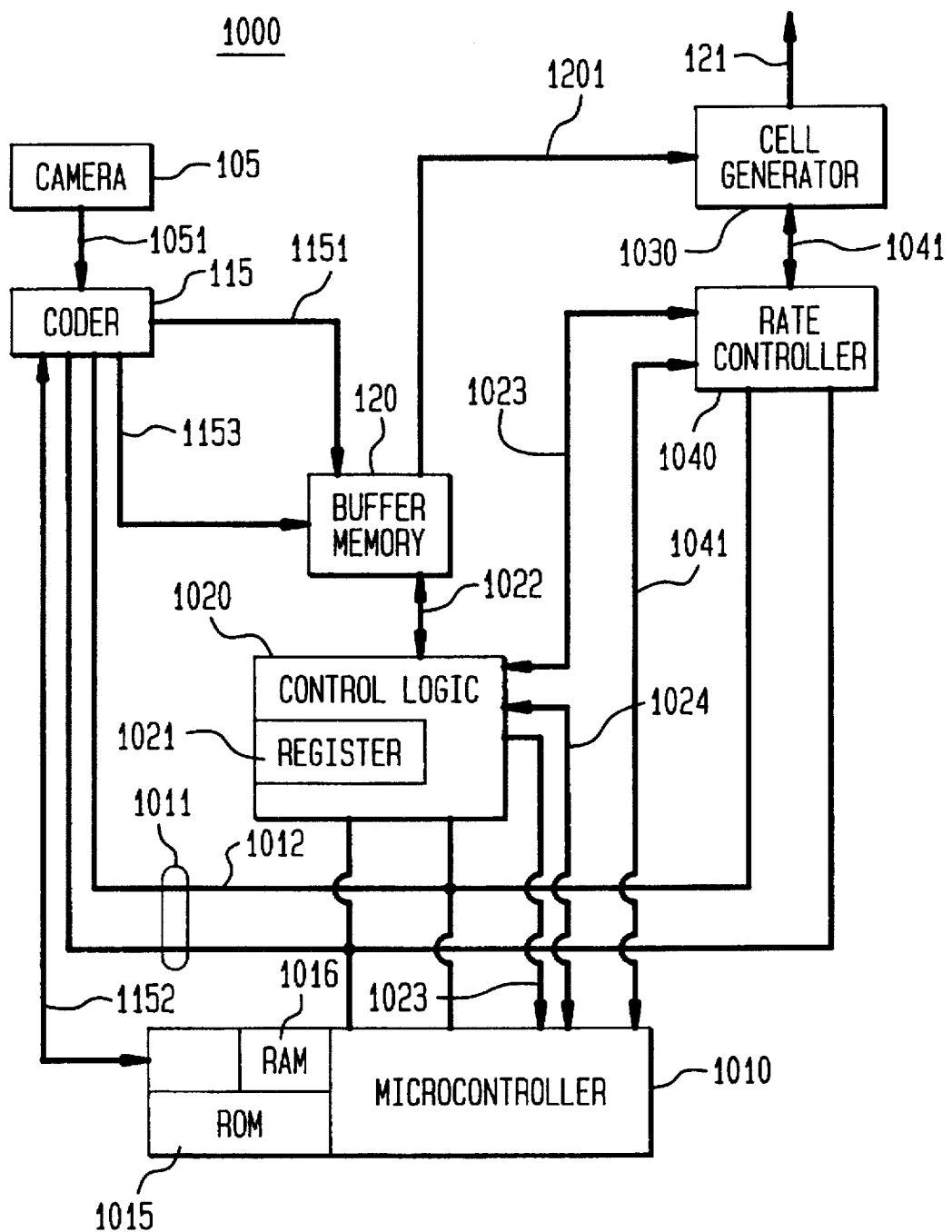
FIG. 10 is a block diagram of a transmitter for smoothing traffic for ATM propagation.

With reference to FIG. 10, there is shown a block diagram of an illustrative embodiment of transmitter system 1000 arranged for smoothing in accordance with the present invention. Transmitter 1000 incorporates components of original transmitter 140 of FIG. 1 and will be referenced accordingly. The smoothing algorithm to iteratively compute the data propagation rate and the corresponding interval over which the computed data rate is utilized is executed by microcontroller 1010, and is stored in ROM 1015 associated with microcontroller 1010; RAM 1016 is also utilized during processing, for example, to store computation results. To perform the smoothing computation, microcontroller 1010 receives the number of bits generated by coder 115 for each frame (X(t) values) via system bus 1011, information about the state of transmitter buffer 120 (C(t) values) via bus 1024, and times at which buffer 120 occupancy crosses preset threshold values of capacity also via bus 1024. Using these inputs, the smoothing algorithm generates transmission rates to control the transmission rate of the transmitter 1000 via the coordinated operation of cell generator 1030 and rate controller 1040 under control of logic 1020 via bus 1023. One microcontroller representative of elements usable for the smoothing computation and algorithm storage is AMD 80C51 available from Advanced Micro Devices.

A typical operational flow is described below. This description is for illustrative purposes only; other sequences and/or implementation options are possible. Since system initialization and resets are well-known in the art, they are not described in any detail in what follows, but are presumed to occur in a conventional manner as needed.

Camera 105 takes a snapshot of a frame once every frame interval and passes frame information to coder 115 over line 1051. The actual duration of the interval depends on the TV standard.

Coder 115 signals the start of a new frame by generating an interrupt to microcontroller 1010 using coder interrupt line 1152. Coder 115 then puts the interrupt vector on system bus 1011 comprising data bus 1012 and address bus 1013. Microcontroller 1010 vectors to an internal interrupt location and executes an interrupt handler routine. The handler routine increments an internal frame counter and the other frame dependent variables such as the current mean number of cells used for forecasts. For the illustrative situation in which new rates are computed at every frame change, an appropriate smoothing program stored in ROM 1015 is executed to compute a new R(t) value. This new value of R(t) is written into an internal register in rate controller 1040 using standard memory mapped or other I/O techniques over system bus 1011. I/O implementation depends on the architecture of the specific microprocessor being deployed. Rate controller 1040 enables cell generator 1030, via line 1041, to partition bits read from transmitter buffer 120 on bus 1201 into cells and then to propagate these cells from cell generator 1030 at the computed rate R(t) onto line 121. This propagation may be accomplished either by controlling the line transmission rate or by leaving appropriate gaps between successive cell transmissions.

The data bits generated by coder 115 are transmitted to buffer 120 over write data bus 1151 and stored in buffer 120 using a standard "handshaking" protocol controlled by buffer control logic 1020 via request/acknowledge line 1153. Buffer control logic 1020, via bus 1022, keeps track of read bus 1201 and write address bus 1151 leaving and entering buffer 120, respectively, and generates the necessary control signals for buffer 120. Logic 1020 also keeps track of the current buffer contents, C(t). This C(t) value is stored in register 1021 which can be read by microcontroller 1010 via system bus 1011. Buffer control logic 1020 also generates interrupts, via lead 1024, to microcontroller 1010 when the buffer occupancy crosses preset thresholds. Servicing of these interrupts causes microcontroller 1010 to perform a rate recomputation which results in rate controller 1040 being instructed, via lead 1023, to make cell generator 1030 propagate at its peak rate, or another appropriate rate determined by the threshold crossed and the previously described smoothing algorithm.

Coder 115 finishes generating all the bits for the current frame and signals this event to microcontroller 1010 by generating an interrupt with a vector different from the one used for the frame-start event.

The smoothing arrangement described above is implemented completely outside coder 115. Another realization is to implement the smoothing arrangement as part of coder 115, particularly if coder 115 is implemented with a microcontroller having sufficient capacity to store and compute the smoothing algorithms.

It is to be understood that the above-described embodiments are simply illustrative of the application of the principles in accordance with the present invention. Other embodiments may be readily devised by those skilled in the art which may embody the principles in spirit and scope. Thus, it is to be further understood that the methodology and concomitant circuitry described herein is not limited to the specific forms shown by way of illustration, but may assume other embodiments limited by the scope of the appended claims.

What is claimed is:

1. A method for smoothing incoming data from video sources to produce outgoing data cell on an ATM network comprising the steps of storing the incoming data to produce stored data, executing a mathematical forecasting algorithm to provide an estimate of future incoming data, said algorithm including a mathematical relationship which utilizes the present and the past stored data, executing a mathematical rate-time algorithm to determine a data cell rate corresponding to said estimate in order that said estimate of the future incoming data is completely propagated over said ATM network within an associated time interval over which said estimate is determined, and generating the outgoing data by propagating the stored data at said data cell rate for the duration of said associated time interval.

2. The method as recited in claim 1 wherein said step of executing a mathematical forecasting algorithm includes the step of generating a series of estimates of future incoming data over a corresponding series of time periods, and wherein said step of executing a mathematical rate-time algorithm to determine said data cell rate includes the steps of computing a sequence of lower and upper bounds to said data cell rate from said series of estimates so as to extract the stored data within one time period plus preselected delay constraint to produce the outgoing data, and selecting said data cell rate as a function of said upper and lower bounds.

3. The method as recited in claim 2 wherein said associated time interval corresponds to a time period used in the computation of a lower bound with a value that exceeds the most recently computed upper bound.

4. The method as recited in claim 2 wherein said step of computing a sequence of lower and upper bounds includes the steps of alternately computing lower and upper bounds based on said estimate, and when the most recently computed lower bound is greater than any previously computed one of said upper bounds, equating said data rate to the least upper bound.

5. The method as recited in claim 2 wherein said step of computing a sequence of lower and upper bounds includes the step of equating said data rate to a value satisfying all of said upper bounds and all of said lower bounds if, after a prescribed time period, all of said upper bounds are greater than all of said lower bounds, and wherein said associated time period then corresponds to said prescribed time period.

6. A method for smoothing incoming data to produce outgoing data over an ATM network comprising the steps of (a) storing the incoming data to produce stored data, (b) executing a mathematical forecasting algorithm to provide and estimate of future incoming data, said algorithm including a mathematical relationship which utilizes the present and the past stored data, (c) executing a mathematical rate-time algorithm to determine a data cell rate corresponding to said estimate in order that said estimate of the future incoming data is completely propagated over said ATM network within an associated time interval over which said estimate is determined, (d) generating the outgoing data by propagating any stored data at said data cell rate for the duration of said associated timer interval, and (e) repeating steps (a)–(d) at the end of said associated time interval so as to iteratively generate the outgoing data.

7. The method as recited in claim 6 wherein said step of executing a mathematical forecasting algorithm includes the step of generating a series of estimates of future incoming data over a corresponding series of time periods, and wherein said step of executing of mathematical rate-time algorithm to determine said data cell rate includes the steps of computing a sequence of lower and upper bounds to said data cell rate from said series of estimates so as to extract the stored data within a preselected delay constraint to produce the outgoing data and selecting said data cell rate as a function of said upper and lower bounds.

8. The method as recited in claim 7 wherein said step of computing a sequence of lower and upper bounds includes the steps of alternately computing lower and upper bounds based on said estimate, and when the most recently computed upper bound is less than any previously computed one of said lower bounds, equating said data rate to the greatest lower bound.

9. The method as recited in claim 7 wherein said step of computing a sequence of lower and upper bounds includes the steps of alternately computing lower and upper bounds based on said estimate, and when the most recently computed lower bound is greater than any previously computed one of said upper bounds, equating said data rate to the least upper bound.

10. The method as recited in claim 7 wherein said step of computing a sequence of lower and upper bounds includes the step of equating said data rate to a value satisfying all of said upper bounds and all of said lower bounds when, after a prescribed time period, all of said upper bounds are greater than all of said lower bounds, and wherein said associated time period then corresponds to said prescribed time period.

11. A method for smoothing an incoming stream of data bits to produce a stream of outgoing data bits over an ATM network, said method comprising the steps of (a) partitioning the incoming stream into data cells composed of a plurality of bits, (b) grouping said cells into segments corresponding to intervals of time, (c) storing said cells in a storage buffer, (d) counting said cells in each of said intervals of time to determine cell counts, (e) executing a mathematical forecasting algorithm to provide and estimate of future cell counts in the incoming stream, said algorithm including a mathematical relationship which utilizes past and present ones of said cell counts, (f) executing a mathematical rate-time algorithm to determine a data cell rate corresponding to said estimate in order that said estimate of the future incoming stream of data is completely propagated over said ATM network within an associated time interval over which said estimate is determined, and (g) generating the stream of outgoing data bits by propagating any of said cells stored in said buffer at said data cell rate for the duration of said associated time interval plus a preselected delay interval.

12. The method as recited in claim 11 where said step of executing a mathematical forecasting algorithm includes the step of generating a series of estimates of future incoming data over a corresponding series of time periods, and wherein said step of executing a mathematical rate-time algorithm to determine said data cell rate includes the steps of computing a sequence of lower and upper bounds to said data cell rate from said series of estimates so as to extract the stored data within a preselected delay constraint to produce outgoing data, and selecting said data rate as a function of said upper and lower bounds.

13. The method as recited in claim 12 wherein said step of computing a sequence of lower and upper bounds includes the steps of alternately computing lower and upper bounds based on said estimate, and when the most recently computed upper bound is less than any previously computed one of said lower bounds, equating said data rate to the greatest lower bound.

14. The method as recited in claim 12 wherein said step of computing a sequence of lower and upper bounds includes the steps of alternately computing lower and upper bounds based on said estimate, and when the most recently computed lower bound is greater than any previously computed one of said upper bounds, equating said data rate to the least upper bound.

15. The method as recited in claim 12 wherein said step of computing a sequence of lower and upper bounds includes the step of equating said data rate to a value satisfying all of said upper bounds and all of said lower bounds when, after a prescribed time period, all of said upper bounds are greater than all of said lower bounds, and wherein said associated time period then corresponds to said prescribed time period.

16. The method as recited in claim 11 further including the step of iteratively repeating steps (a) through (g) at the end of said associated time interval so as to iteratively generate the stream of outgoing data bits.

* * * * *